United States Patent [19]
Matsufune

[11] Patent Number: 5,995,142
[45] Date of Patent: Nov. 30, 1999

[54] AUTOMATIC WHITE BALANCE CONTROL SYSTEM FOR A COLOR VIDEO CAMERA

[75] Inventor: Isao Matsufune, Kanagawa, Japan

[73] Assignee: Sony Corporation, Tokyo, Japan

[21] Appl. No.: 08/828,532

[22] Filed: Mar. 31, 1997

[30] Foreign Application Priority Data

Feb. 4, 1996 [JP] Japan ................... 8-102041
Mar. 2, 1997 [JP] Japan ................... 9-032571

[51] Int. Cl.[6] .................................... H04N 9/73
[52] U.S. Cl. .................. 348/223; 348/225; 348/655
[58] Field of Search .................. 348/223, 224, 348/225, 655; 358/516

[56] References Cited

U.S. PATENT DOCUMENTS

| | | | |
|---|---|---|---|
| 4,797,733 | 1/1989 | Takagi et al. ............ | 348/223 |
| 4,911,552 | 3/1990 | Kurashige et al. . | |
| 5,099,316 | 3/1992 | Ogawa . | |
| 5,146,316 | 9/1992 | Suzuki ................... | 348/223 |
| 5,182,636 | 1/1993 | Kikuchi et al. . | |
| 5,267,026 | 11/1993 | Kawahara et al. . | |
| 5,272,521 | 12/1993 | Tatsumi ................. | 348/223 |
| 5,319,449 | 6/1994 | Saito et al. ............ | 348/223 |
| 5,442,409 | 8/1995 | Haruki et al. ......... | 348/655 |
| 5,448,292 | 9/1995 | Matsui et al. ......... | 348/225 |
| 5,563,656 | 10/1996 | Kyuma ................... | 348/223 |
| 5,644,359 | 7/1997 | Ito .......................... | 348/223 |
| 5,654,753 | 8/1997 | Takei ..................... | 348/223 |

FOREIGN PATENT DOCUMENTS

| | | |
|---|---|---|
| 0400606 | 12/1990 | European Pat. Off. . |
| 0663779 | 7/1995 | European Pat. Off. . |
| 2-194792 | 8/1990 | Japan . |

*Primary Examiner*—Tuan Ho
*Assistant Examiner*—Luong Nguyen
*Attorney, Agent, or Firm*—Frommer Lawrence & Haug, LLP.; William S. Frommer

[57] ABSTRACT

An imaging device includes an imaging device for converting an image into a plurality of color signals each having a signal level; a white balance amplifier for adjusting the signal level of at least one color signal to produce a plurality of amplified color signals; a calibration device for calibrating the white balance amplifier and for producing at least one calibration parameter; a detecting device for detecting the amplified color signals; a calculation device for calculating at least one white balance amplification adjustment as a function of the plurality of amplified color signals; a comparing device for comparing at least one white balance amplification adjustment with at least one calibration parameter; and an automatic adjustment device for automatically adjusting the white balance amplifier to amplify the signal level of at least one of the plurality of color signals if at least one white balance amplification adjustment is consistent with at least one calibration parameter.

24 Claims, 9 Drawing Sheets

→ ATW ADJ : (YES → ▲)
  → R : 135
    B : 128

FIG.5(b)

ATW ADJ : (YES → ▲)
  R : 135
→ B : 130

AUTOMATIC WHITE BALANCE CONTROL SYSTEM FOR A COLOR VIDEO CAMERA

BACKGROUND OF THE INVENTION

In a color video camera, white balance is achieved when a neutral white object imaged by the camera under given illumination is represented as red (R), green (G), and blue (B) signals having equal output levels. White balance is needed since the RGB representation produced by a color video camera typically changes as the illumination of a scene varies. In some circumstances, a color video camera white balanced for certain illumination conditions will not be white balanced for other illumination conditions. As a result, it is possible that an object under two different illuminations will have two different RGB representations even though a human observer would perceive the object as having the same color under both illuminations.

In a manual operation, white balance is achieved by imaging a neutral white object under the illumination of interest and adjusting the amplification of one or more of the red, green, and blue signals until their respective output levels are equal. In an automatic white balance (AWB) operation, a neutral white object under the illumination of interest is imaged and the amplification levels of each of the red and blue signals are adjusted. For example, the output levels of the red and blue signals may be made equal to that of the green signal. In both operations, maintenance of white balance will depend upon the consistency of the illumination conditions and maintenance of the adjusted amplification levels.

In an automatic tracing white balance (ATW) operation, the white balance operation is automatically repeatedly carried out during an ordinary imaging process. Since an ordinary imaged scene may not contain a neutral white object, it is possible that the white balance will be incorrectly adjusted with reference to a colored object. Consequently, true white balance may not be achieved, e.g. a non-white color is represented as the color white.

Figure 9:
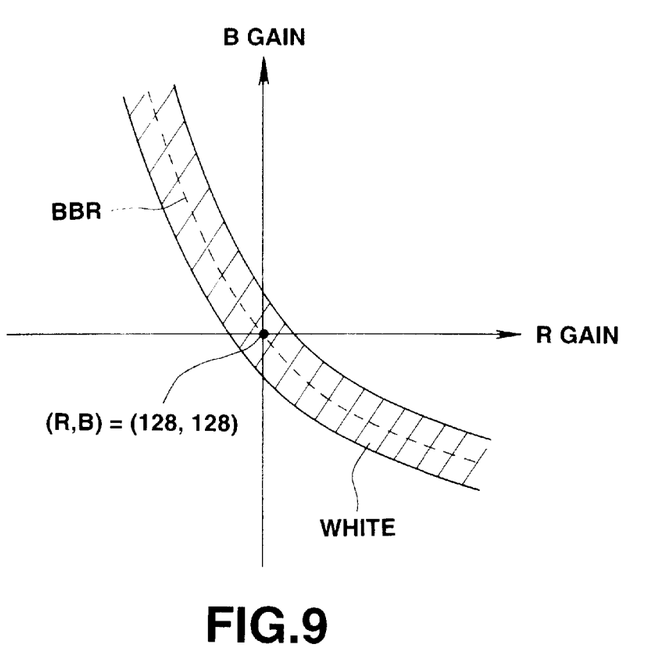
FIG. 9 is a diagram of gain values.

FIG. 9 illustrates a black body radiation curve BBR, plotted on red signal gain vs. blue signal gain axes relative to red and blue signal amplifiers in a video camera. As shown, signal gain values are represented by eight-bits and, accordingly, each axis extends from 0 to 256. The red signal gain and blue signal gain axes intersect at the point (128, 128). Also illustrated is a white area, indicated by slanted lining, which is generally symmetric about the black body radiation curve BBR. The white area represents red and blue signal values which are characteristic of the color white.

To avoid the problem of incorrect white balance adjustment during an ATW operation, the red and blue signal values representing an imaged scene may be compared to a predetermined set of red and blue signal values characteristic of the color white. The white area comprises such a set of red and blue signal values characteristic of the color white.

Previously, it was attempted to manually calibrate the white area such that output levels of the respective R, G, and B signals are mutually equal when a reference light source is imaged. With reference to FIG. 9, calibration with respect to a standard light source would be attained when the B signal gain and the R signal gain are both equal to 128.

In practice, a variable resistance was provided to manually adjust white balance amplification while a standard light source was imaged. A manual adjustment was made of the R signal and B signal output levels to make them equal to the G signal output level. Since the adjustment was made manually by a user or technician, errors in calibration have occurred and a precise adjustment has been difficult to achieve. Miscalibration introduces error into the ATW operation, reducing its effectiveness. Additionally, the introduction of manual adjustment error may significantly limit further improvement in ATW processing efforts. Further error is introduced if the setting of the variable resistance shifts after a manual adjustment. Repeated manual readjustment can be difficult.

OBJECTS AND SUMMARY OF THE INVENTION

Therefore, an object of the present invention is to provide apparatus and methodology for an improved white balance operation.

Another object of the present invention is to provide an automatic white balance operation and an automatic tracing white balance operation with improved accuracy and precision.

Still another object of the present invention is to provide an adaptive automatic tracing white balance operation for precisely adjusting white balance based upon the results of previous automatic white balance operations.

According to an aspect of the present invention, an imaging device is provided which includes an imaging device that converts an image into a plurality of color signals each having a signal level; a white balance amplifier that adjusts the signal level of at least one of the color signals to produce a plurality of amplified color signals; a calibration device that calibrates the white balance amplifier and produces at least one calibration parameter; a detecting device that detects the amplified color signals; a calculation device that calculates at least one white balance amplification adjustment as a function of the amplified color signals; a comparing device that compares at least one white balance amplification adjustment with at least one calibration parameter; and an automatic adjustment device that automatically adjusts the white balance amplifier to amplify the signal level of at least one color signal if at least one white balance amplification adjustment is consistent with at least one calibration parameter.

According to another aspect of the present invention, an imaging device is provided which includes an imaging device for converting an image into a plurality of color signals each having a signal level; a white balance amplifier that adjusts the signal level of at least one color signal to produce a plurality of amplified color signals; a calibration device for repeatedly calibrating the white balance amplifier and for producing a plurality of calibration parameters; a detecting device that detects the amplified color signals; a first calculation device that calculates at least one white balance amplification adjustment as a function of the amplified color signals; a storage device that stores the calibration parameters; a second calculation device that retrieves the calibration parameters from the storage means and that calculates an overall calibration factor as a function of the plurality of calibration parameters; a comparing device that compares at least one white balance amplification adjustment with the overall calibration parameter; and an automatic adjustment device for automatically adjusting the white balance amplifier to amplify the signal level of at least one of the color signals if at least one white balance amplification adjustment is consistent with the overall calibration parameter.

Other objects, features, and advantages according to the present invention will become apparent from the following detailed description of illustrated embodiments when read in conjunction with the accompanying drawings in which the same components are identified by the same reference numerals.

DETAILED DESCRIPTION OF THE PREFERRED EMBODIMENTS

Figure 1:
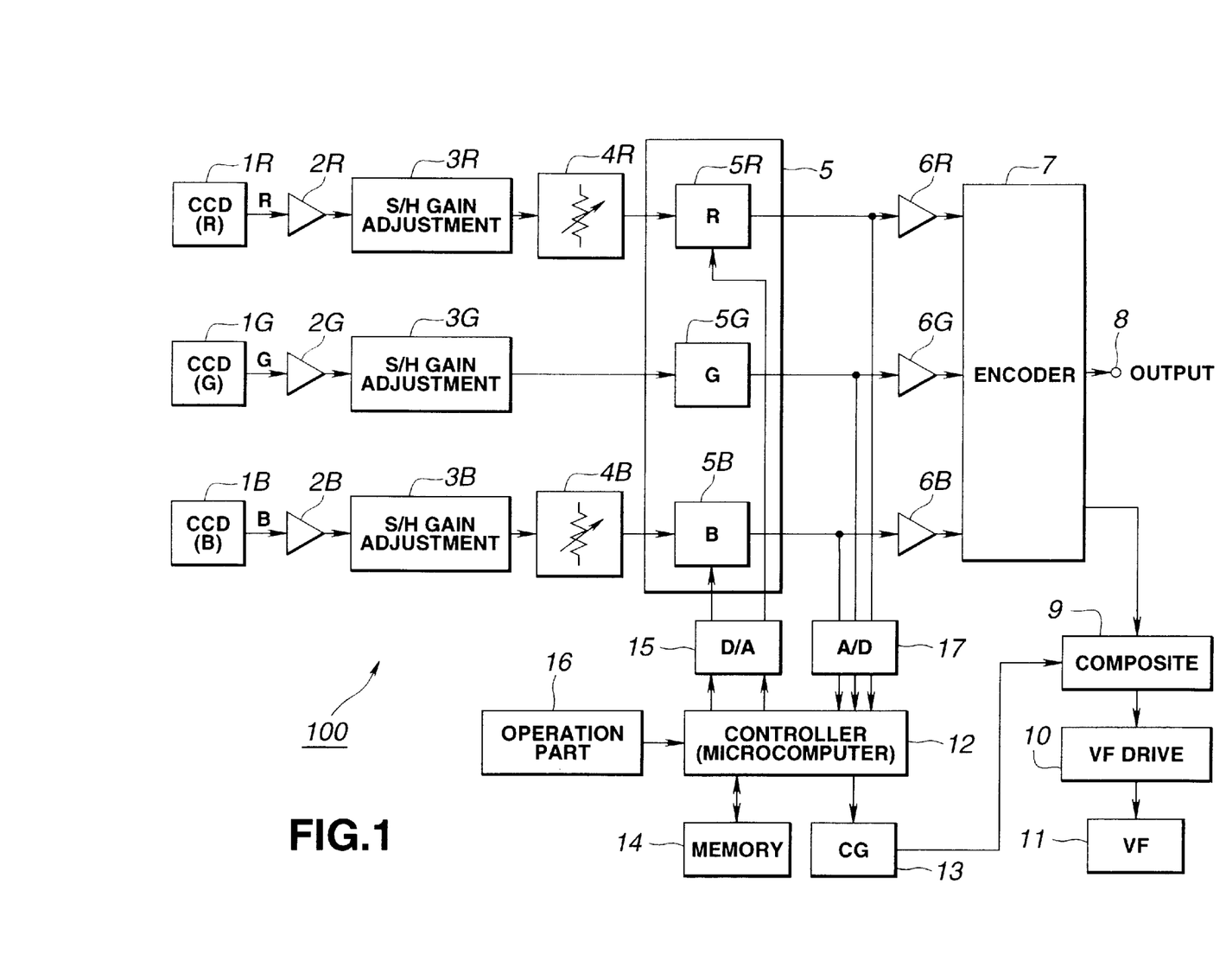
FIG. 1 is a block diagram of an image recorder according to an embodiment of the present invention.

FIG. 1 illustrates an imaging device 100 according to an embodiment of the present invention. Imaging device 100 includes charge-coupled devices (CCD) 1R, 1G, and 1B; preamplifiers 2R, 2G, and 2B; sample/hold gain control circuits 3R, 3G, and 3B; variable resistors 4R and 4B; white balance amplifier 5; amplifiers 6R, 6G, and 6B; encoder 7; composite circuit 9, view finder driver 10, view finder 11, controller 12, character generator 13, memory device 14, digital-to-analog (D/A) converter 15, operation circuit 16; and analog-to-digital (A/D) converter 17.

CCD 1R, CCD 1G, and CCD 1B are conventional primary color image pick-up devices for imaging incident red, green, and blue light, respectively. CCD 1R produces a red signal R, CCD 1G produces a green signal G, and CCD 1B produces a blue signal B which are transmitted to respective pre-amplifiers 2R, 2G, and 2B. Pre-amplifiers 2R, 2G, and 2B are conventional pre-amplifier devices for amplifying input signals.

Pre-amplifiers 2R, 2G, and 2B output amplified R, G, and B signals to respective sample/hold gain control circuits 3R, 3G, and 3B. Sample/hold gain control circuits 3R, 3G, and 3B sample and hold input signals in a conventional manner and pre-process the input image signals. For example, such pre-processing may include gain control, flare processing, pre-knee compensation, or the like.

Pre-processed R and B signals from sample/hold gain control circuits 3R and 3B are supplied to respective variable resistors 4R and 4B. Variable resistors 4R and 4B are variable resistance elements for further adjusting the pre-processed R and B signals, respectively. Variable resistors 4R and 4B are utilized to adjust the levels of pre-processed R and B signals to achieve a white balance operation.

White balance amplifier 5 is comprised of variable-gain amplifiers 5R and 5B, along with amplifier 5G. Each of variable-gain amplifiers 5R and 5B are conventional variable-gain amplifiers, while amplifier 5G is a conventional amplifier. Variable-gain amplifier 5R amplifies the signal supplied from variable resistor 4R to produce an amplified R signal which is supplied to amplifier 6R. Variable-gain amplifier 5B amplifies the signal supplied from variable resistor 4B to produce an amplified B signal which is supplied to amplifier 6B. Amplifier 5G amplifies the pre-processed G signal supplied from sample/hold gain control circuit 3G to produce an amplified G signal which is supplied to amplifier 6G.

As a practical example, a white balance operation could be achieved by imaging a reference light source, setting the gains of variable-gain amplifiers 5R and 5B at intermediate values, and then adjusting variable resistors 4R and 4B such that the outputs of amplifier 5 are equal. However, in the present embodiment, primarily variable-gain amplifiers 5R and 5B are utilized to achieve the white balance operation.

Amplifiers 6R, 6G, and 6B are conventional amplifier devices which further amplify the amplified R, G, and B signals input respectively thereto, and which output further amplified R, G, and B signals to encoder 7.

The amplified R, G, and B signals are also supplied to A/D converter 17. A/D converter 17 is a conventional analog-to-digital conversion device. A/D converter 17 converts the amplified R, G, and B signals to digital R, G, and B signals, respectively, which are supplied to controller 12.

Controller 12 is a conventional controller device, preferably a conventional microprocessor device, which operates to control imaging device 100. Controller 12 is, in turn, responsive to control signals provided by operation circuit 16. Alternatively, operation circuit 16 stores software programs which are accessed by and implemented within controller 12 to direct the operation of controller 12. Operation circuit 16 is preferably a source of control signals. Alternatively, operation circuit 16 is a memory device which stores software programs for directing the operation of controller 12. Controller 12 utilizes memory 14, a conventional data storage device, in performing its control operations. Memory 14 may store parameter data, such as gain control values, for an AWB operation by controller 12, provide temporary data storage for controller 12 during computations and other processing, and perform additional similar activities.

Encoder 7 is a conventional signal processing and encoding device. Encoder 7 may process the further amplified R, G, and B signals output by amplifiers 6R, 6G, and 6B to achieve gamma correction, knee correction, or the like. The input signals are then matrix processed to produce a brightness signal Y and color difference signals R-Y and B-Y. Further, the brightness signal and the color difference signals are encoded by an NTSC encoding process to produce a color composite video signal in accordance with the NTSC standard. The color composite video signal is output at output terminal 8. The brightness signal and the color difference signals, or alternatively, corresponding image signals of another form, are also supplied to composite circuit 9.

Character generator 13 is a conventional character generation device for generating character image signals in response to character commands from controller 12. Character generator 13 supplies character image signals to composite circuit 9. Composite circuit 9 is a composition device for superimposing character image signals from character generator 13 onto image signals from encoder 7 to produce a composite signal.

The composite signal is supplied to view finder driver 10, a conventional view finder driving device. View finder driver 10 drives view finder 11 to display an image corresponding to the composite signal to a user. View finder 11 is a conventional view finder-type display device.

Controller 12 detects the respective signal levels of the amplified R, G, and B signals and controls imaging device 100 to achieve both AWB and ATW operations to produce an improved white balance control. In operation, as a function of the respective signal levels of the amplified R, G, and B signals, controller 12 adjusts the respective gains of variable-gain amplifiers 5R and 5B. Specifically, controller 12 supplies digital gain control signals to D/A converter 15, a conventional digital-to-analog conversion device, which converts the digital signals to analog form. The analog signals are supplied to variable-gain amplifiers 5R and 5B to control their amplification. Thus, A/D converter 17, controller 12, and D/A converter 15 comprise a feedback control system for controlling amplifier 5.

To display information, such as operational state information, display mode, and the like, to a user, controller 12 supplies character commands corresponding to such information to character generator 13. Character generator 13 generates character image signals corresponding to the supplied character commands and outputs such signals to composite circuit 9. Composite circuit 9 superimposes the character image signals on image signals supplied from encoder 7 to produce a composite signal for output to view finder driver 10. View finder driver 10 drives view finder 11 to display the composite signal to the user. Accordingly, the user may monitor the imaged scene and the effect of the white balance processing, and view informative text.

In an AWB operation, controller 12 monitors the signal levels of the amplified R, G, and B signals while a white reference object is imaged. Controller 12 then calculates the amplification amount (gain) needed to equalize each of the amplified R and B signals with the amplified G signal. Corresponding gain control signals are supplied by controller 12, through D/A converter 15, to variable-gain amplifiers 5R and 5B, respectively. In this manner, each of variable-gain amplifiers 5R and 5B are independently adjusted by controller 12 and white balance is achieved at the outputs of amplifier 5.

Figure 4A:
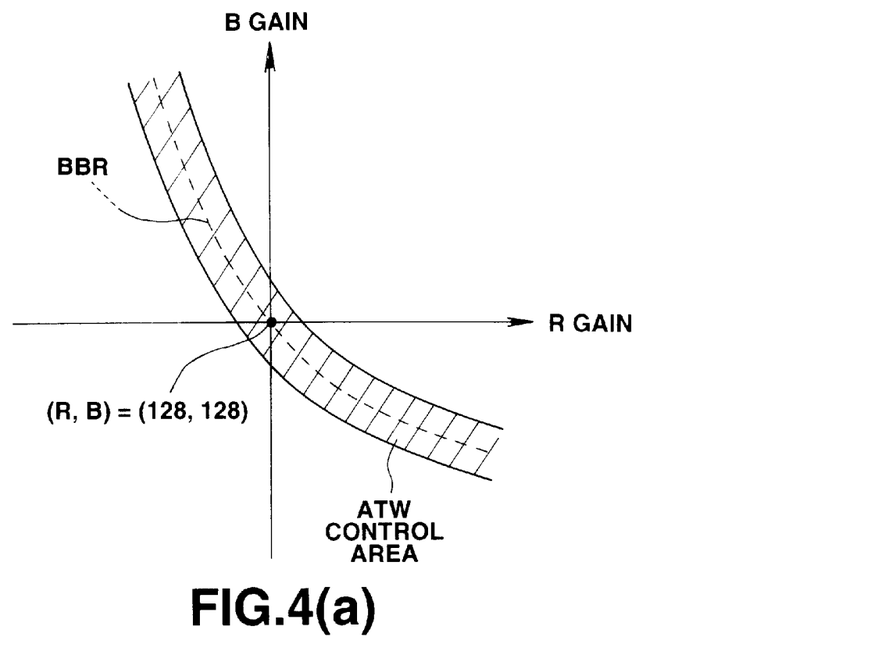
FIGS. 4(a) and 4(b) are diagrams of gain values.
Figure 4B:
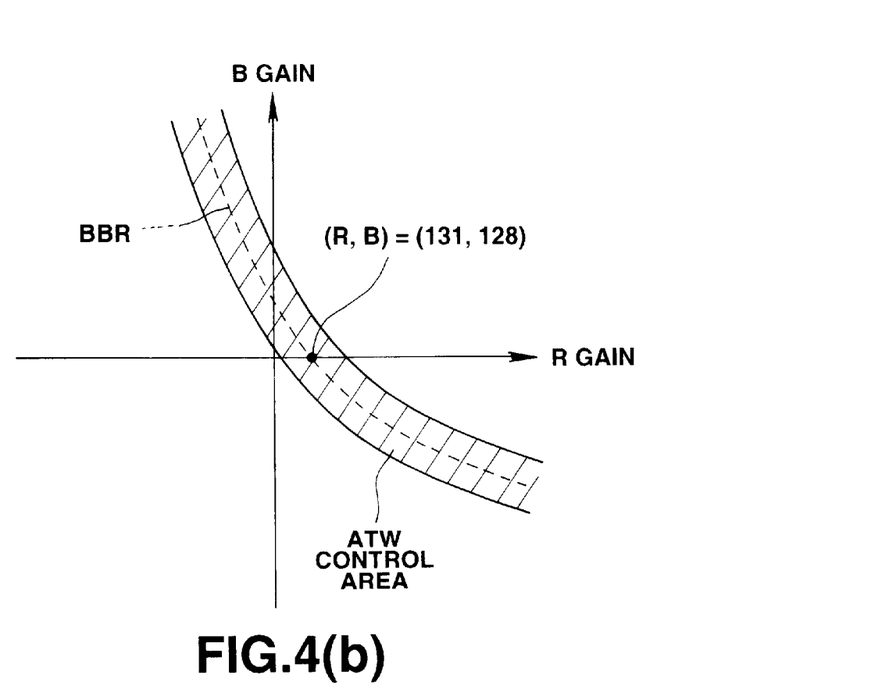

In an ATW operation, controller 12 consults a predetermined set of red and blue signal values characteristic of the color white. FIGS. 4(a) and 4(b) illustrate an ATW control area which comprises such a set of red and blue signal values characteristic of the color white, along with a black body radiation curve BBR. As shown, the ATW control area, indicated by slanted lining, is preferably symmetric about black body radiation curve BBR.

The ATW control area and the curve BBR are plotted on red signal gain vs. blue signal gain axes relative to the respective gains of variable-gain amplifiers 5R and 5B. Signal gain values are represented by eight-bits and, accordingly, each axis extends from 0 to 256. The red signal gain and blue signal gain axes intersect at the point (128, 128). Preferably, the ATW control area is centered at the point (128,128), as shown in FIG. 4(a), which would correspond to a color temperature of 3200K.

To initially calibrate the ATW control area an AWB operation is executed, preferably during the manufacturing process. A standard light source is imaged by CCD's 1R, 1G, and 1B. The corresponding R, G, and B signals are transmitted to pre-amplifiers 2R, 2G, and 2B, respectively, which amplify the respective signals. Sample/hold gain control circuits 3R, 3G, and 3B sample and hold the pre-amplified R, G, and B signals, respectively, and pre-process the resulting signals to produce pre-processed R, G, and B signals, respectively.

The pre-processed R and B signals are supplied to variable resistors 4R and 4B, respectively. Preferably, variable resistors 4R and 4B are initially set in a fixed, e.g. constant resistance, state. Variable resistors 4R and 4B adjust the respective levels of the pre-processed R and B signals and supply the adjusted R and B signals to variable-gain amplifiers 5R and 5B, respectively. The pre-processed G signal is supplied to variable-gain amplifier 5G.

Variable-gain amplifiers 5R, 5G, and 5B provide an initial amount of amplification to each of the input R, G, and B signals to produce amplified R, G, and B signals, respectively. Controller 12, through A/D converter 17, detects the output levels of the amplified R, G, and B signals and calculates the gain adjustments needed by variable-amplifiers 5R and 5B, respectively, to equalize the amplified R and B signals with the amplified G signal. Controller 12 stores the gain adjustment values in memory 14 and supplies corresponding gain control signals to variable-amplifiers 5R and 5B through D/A converter 15. The respective amplification levels of variable-amplifiers 5R and 5B are adjusted accordingly.

It is noted that the above-described AWB operation implements a feedback loop which omits any adjustment of variable resistors 4R and 4B. Preferably, variable resistors are retained for other adjustment operations. Optionally, the variable resistors may be omitted entirely. Alternatively, variable resistors 4R and 4B may be utilized to coarsely adjust the signal levels of the R and B signals input to amplifier 5, after which the feedback loop is utilized to achieve precise white balance calibration.

Following calibration of the ATW control area, an ATW operation can be executed. As will be described below, the gain adjustment values calculated in a preceding AWB operation are utilized during the ATW operation to calibrate the ATW control area prior to ATW processing. The AWB operation may be an initial AWB operation executed during the manufacturing of imaging device 100 or may be a subsequent AWB operation executed by a user.

In an ATW operation, preferably, controller 12 issues to character generator 13 character commands corresponding to a menu of user functions. Character generator 13 generates character image signals corresponding to the menu and outputs such signals to composite circuit 9. Composite circuit 9 superimposes the menu on image signals supplied from encoder 7 to produce a composite signal for output to view finder driver 10. View finder driver 10 drives view finder 11 to display the composite signal which includes the menu to the user.

Figure 3:
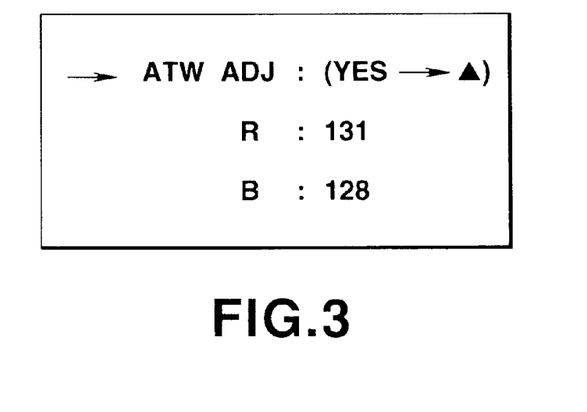
FIG. 3 is a menu display diagram.

FIG. 3 illustrates a preferred ATW operation menu. As shown, the user is displayed a prompt to initiate an ATW adjustment operation ("ATW ADJ"). When the ATW adjustment operation is selected by the user, the R and B signal gain adjustments calculated by controller 12 in a preceding AWB operation are then displayed and stored by controller 12 in memory 14 as signal gain adjustments Radj and Badj, respectively. Optionally, the R and B signal gain adjustments are initially displayed along with the ATW adjustment operation prompt. In this manner, subsequent AWB operations may be utilized to update stored Radj and Badj values.

Preferably, the user's selection of the ATW adjustment operation is entered via a user interface portion of operation circuit 16. Operation circuit 16 transmits the user's selection to controller 12 which initiates the ATW adjustment operation accordingly. The ATW adjustment operation may be carried out repeatedly by a user as needed.

Figure 2:
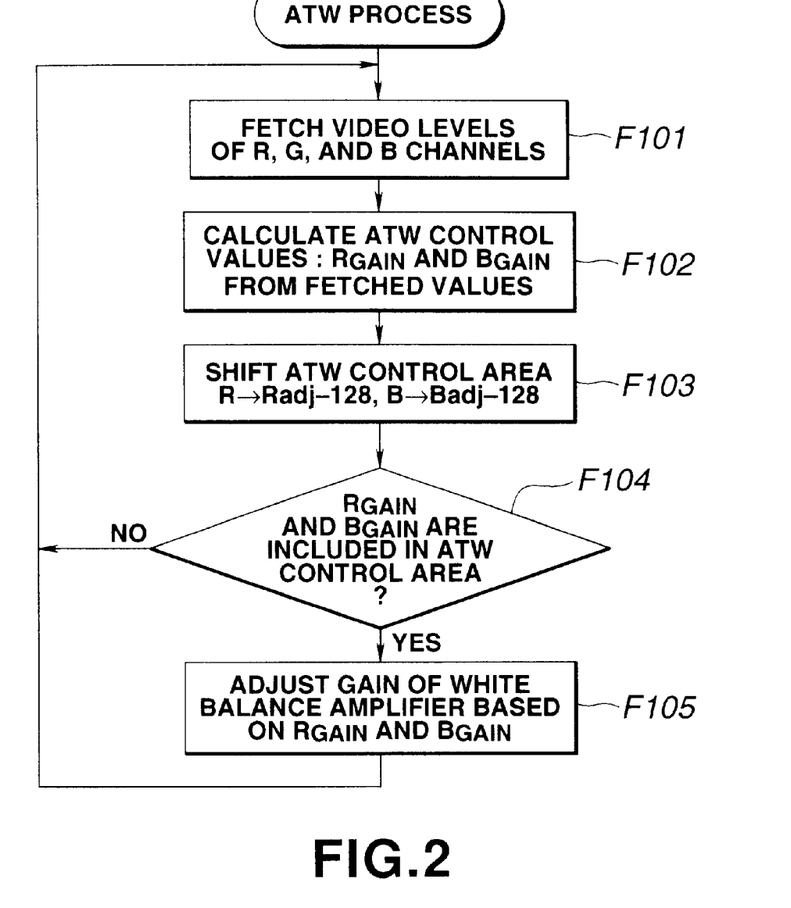
FIG. 2 is flow chart to which reference will be made in describing the operation of an image recorder according to the present invention.

FIG. 2 illustrates an ATW adjustment operation method according to an embodiment of the present invention. In step F101, controller 12 detects the output signal levels of the amplified R, G, and B signals via A/D converter 17, and processing proceeds with step F102. In step F102, controller 12 calculates the gain adjustments, $R_{GAIN}$ and $B_{GAIN}$, needed by variable-amplifiers 5R and 5B, respectively, to equalize the amplified R and B signals with the amplified G signal, and processing proceeds with step F103.

In step F103, an offset for the ATW control area is calculated by subtracting the ideal intermediate amplification value, e.g. 128 in the present example, from each of the stored signal gain adjustments Radj and Badj. As an example, utilizing sample Radj and Badj values from FIG. 3, Radj=131 and Badj=128, an R gain offset of 3 (=131−128) and a B gain offset of 0 (=128−128) can be calculated. Controller 12 corrects (shifts) the ATW control area by an amount equal to the calculated R gain offset and B gain offset values. Further to the above example, correction of the ATW control area of FIG. 4(a) is achieved by shifting the ATW control area by three R gain units and zero B gain units as shown in FIG. 4(b). Of course, the ATW control area may be shifted along the Rgain axis, the Bgain axis, or both depending on the calculated offset values. Processing proceeds with step F104.

In step F104, the gain adjustments, $R_{GAIN}$ and $B_{GAIN}$, calculated by controller 12 are compared by controller 12 to the corrected ATW control area. If either $R_{GAIN}$ or $B_{GAIN}$ is outside the corrected ATW control area, i.e. represent values not included among the set of values represented by the ATW control area, then controller 12 determines that the present corresponding image is not suitable for use in white balance adjustment, amplifiers 5R and 5B are not adjusted, and processing returns to step F101. If both $R_{GAIN}$ and $B_{GAIN}$ are within the corrected ATW control area, i.e. represent values included among the set of values represented by the ATW control area, then controller 12 determines that the present corresponding image is suitable for use in white balance adjustment and processing proceeds with step F105.

In step F105, controller 12 supplies gain control signals corresponding to the $R_{GAIN}$ and $B_{GAIN}$ values through D/A converter 15 to variable-gain amplifiers 5R and 5B, respectively. In this manner white balance is achieved. The white balanced signals are amplified by amplifiers 6R, 6G, and 6B, encoded by encoder 7, and output at output terminal 8.

In an alternate ATW operation, variation in the reference light source used for white balance calibration can be accommodated by manual adjustment of the ATW control area. Variation in the reference light source may be measured by a user with a color chromaticity system and the resulting measurements converted into corresponding signal gain adjustment values, Radj and Badj for correction (shift) of the ATW control area.

Figure 5A:
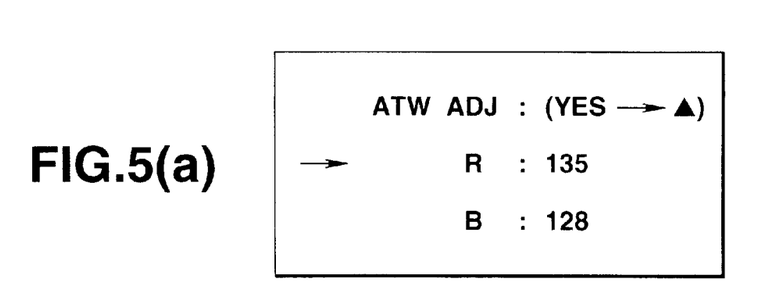
FIGS. 5(a) and 5(b) are menu display diagrams.
Figure 5B:
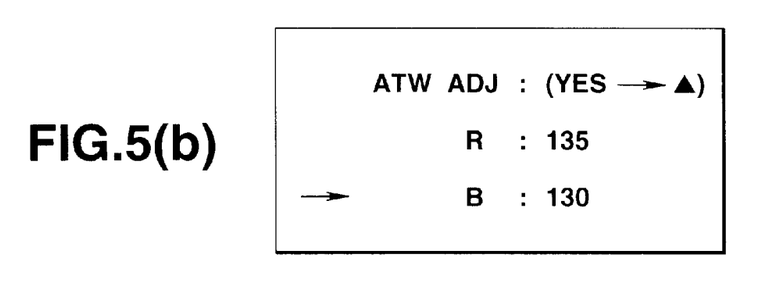

FIGS. 5(a) and 5(b) illustrate an alternative ATW operation menu. As in the menu of FIG. 3, the user is displayed a prompt to initiate an ATW adjustment operation ("ATW ADJ") along with the R and B signal gain adjustments calculated by controller 12 in a preceding AWB operation. Additionally, the user is prompted to modify, if desired, the displayed R and B signal gain adjustment values. The user enters a desired modification via the user interface portion of operation circuit 16. FIG. 5(a) shows a user's modification of the R signal gain adjustment value to 135 and FIG. 5(b) shows a user's modification of the B signal gain adjustment value to 130. The modified R and B signal gain adjustments are stored by controller 12 in memory 14 as signal gain adjustments Radj and Badj, respectively, e.g. Radj=135 and Badj=130. Of course, the preceding values are intended to illustrate and not limit the scope of the present invention.

Figure 6:
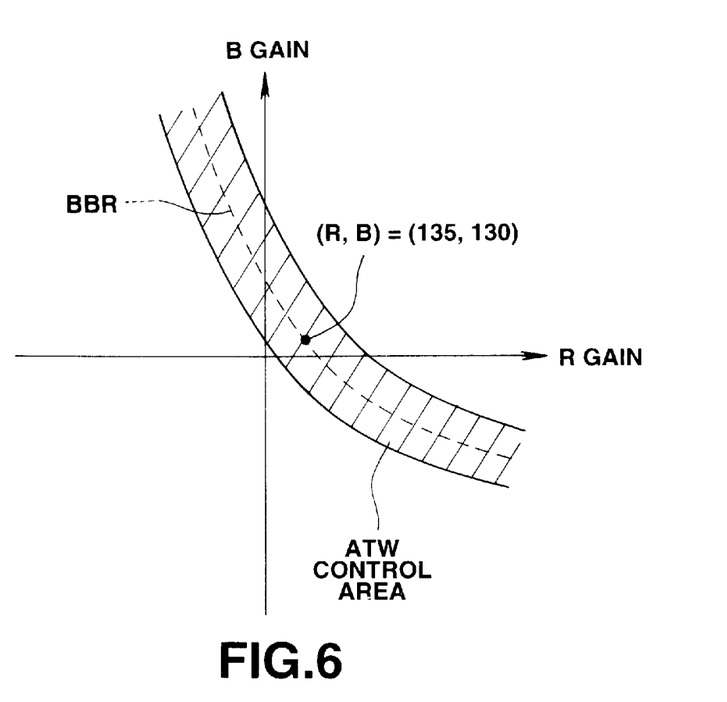
FIG. 6 is a diagram of gain values.

Otherwise, ATW processing proceeds as illustrated in FIG. 2. Utilizing the sample modified signal gain adjustment values mentioned above, the ATW control area of FIG. 4(a) is correspondingly corrected by shifting the area by seven R gain units and two B gain units as shown in FIG. 6.

In a further embodiment of imaging device 100, controller 12 stores multiple sets of R signal gain adjustment and B signal gain adjustment values produced by successive implementation of the above-described AWB operation and/or manual adjustment of the ATW control area. For example, Radj and Badj values from a previous ten AWB operations may be stored in memory 14 for selective recall by a user.

Preferably, sets of R signal gain adjustment and B signal gain adjustment values, Radj and Badj, are stored in memory 14 as (Rawb[1], Bawb[1]), (Rawb[2], Bawb[2]) . . . (Rawb[10], Bawb[10]) in reverse chronological order, where "(Rawb[x], Bawb[x])" (x=1, 2, . . . 10) represents a pair of registers, or simply address locations, in memory 14. Preferably, after each AWB operation or manual adjustment of the ATW control area, the oldest R signal gain adjustment value and the oldest B signal gain adjustment value, e.g. the values stored in (Rawb[10], Bawb[10]), are discarded; each of the remaining pairs of values are shifted by one register (address location is incremented); and the new R and B signal gain adjustment values are stored in (Rawb[1], Bawb[1]). In this manner, the reverse chronological order is preserved.

Figure 7:
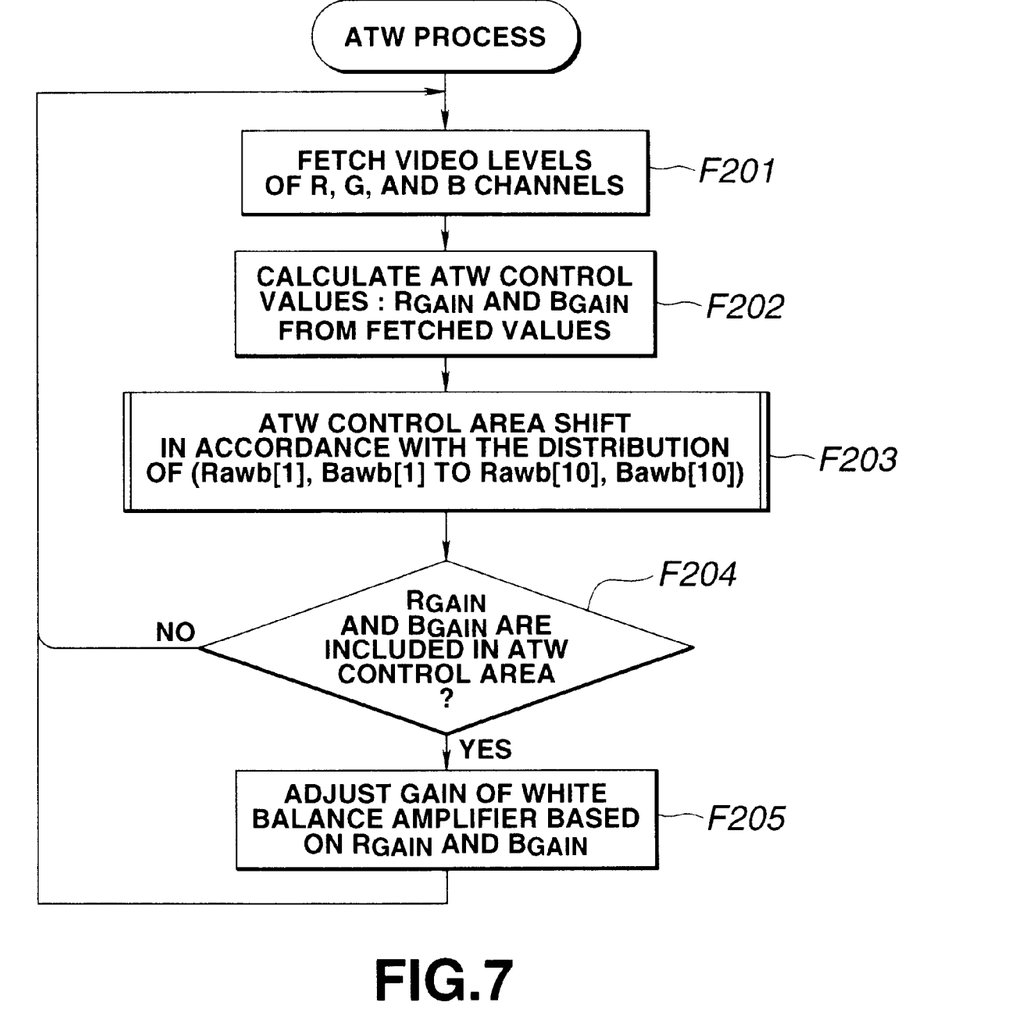
FIG. 7 is flow chart to which reference will be made in describing another operation of an image recorder according to the present invention.

A method of ATW processing with storage of multiple signal gain adjustment values is illustrated in FIG. 7. In step F201, processing is executed as described above with respect to step F101 but is followed by step F202. In step F202, processing is executed as described above with respect to step F102 but is followed by step F203.

In step F203, an offset for the ATW control area is calculated as a function of the distribution of the pairs of Radj and Badj values stored in memory 14, e.g. (Rawb[1], Bawb[1]), (Rawb[2], Bawb[2]) . . . (Rawb[10], Bawb[10]). This calculation will be described in further detail hereinbelow. Controller 12 corrects (shifts) the ATW control area by an amount equal to the calculated R gain offset and B gain offset values.

In subsequent step F204, if either $R_{GAIN}$ or $B_{GAIN}$ is outside the corrected ATW control area, i.e. represent values not included among the set of values represented by the ATW control area, then controller 12 determines that the present corresponding image is not suitable for use in white balance adjustment, amplifiers 5R and 5B are not adjusted, and processing returns to step F201. If both $R_{GAIN}$ and $B_{GAIN}$ are within the corrected ATW control area, i.e. represent values included among the set of values represented by the ATW control area, then controller 12 determines that the present corresponding image is suitable for use in white balance adjustment and processing proceeds with step F205.

In step F205, processing is executed as described above with respect to step F105 but is followed by step F201.

Figure 10A:
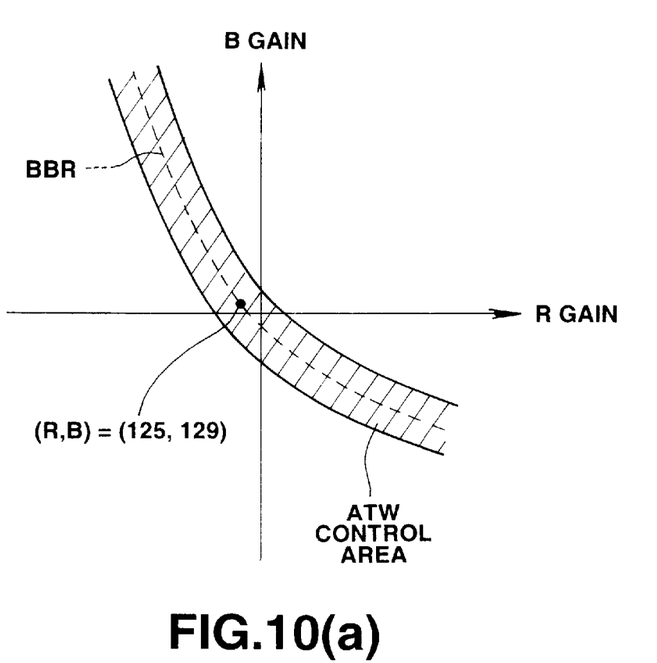
FIGS. 10(a) and 10(b) are diagrams of gain values.
Figure 10B:
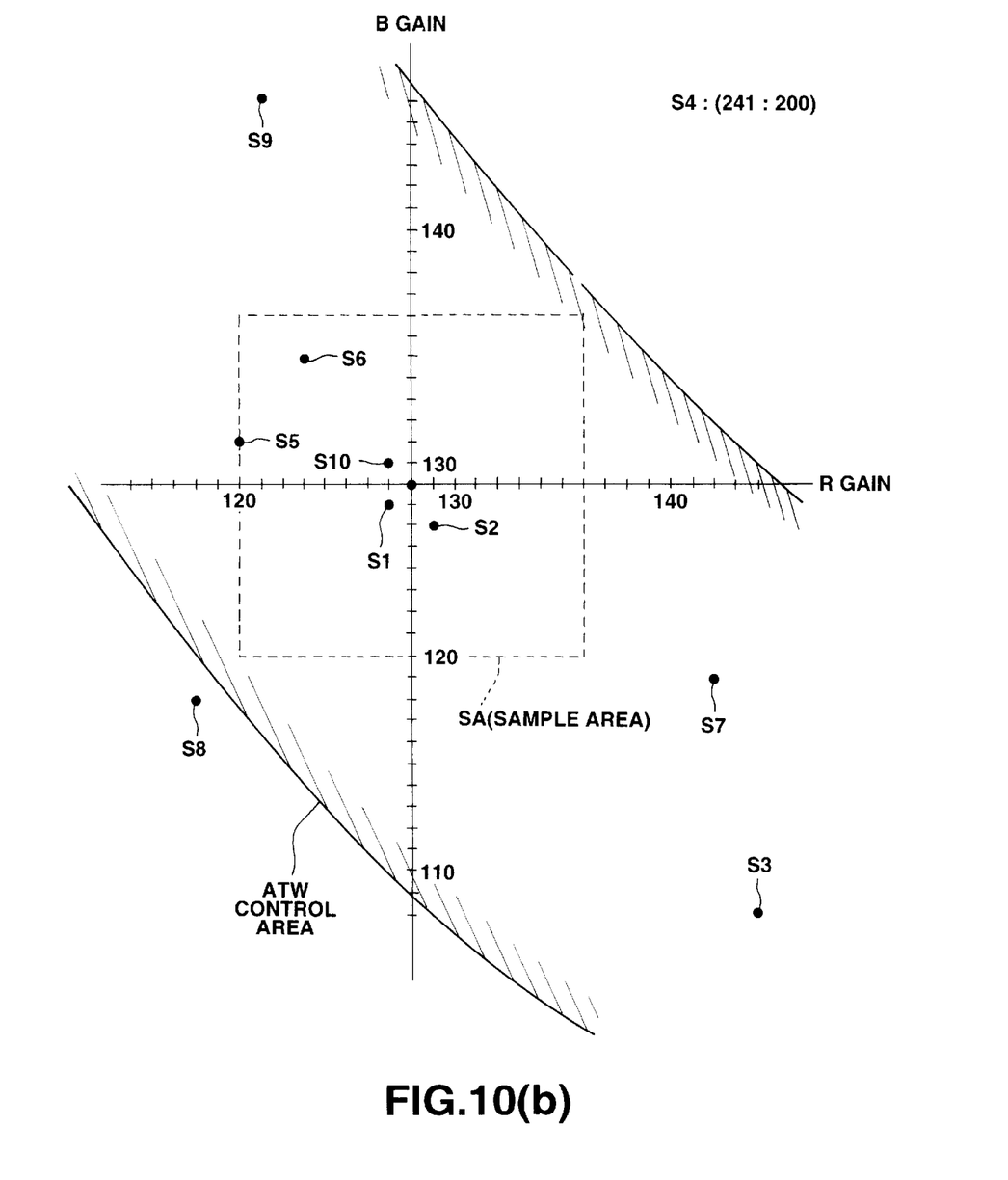

The offset calculation of step F203 will be described in further detail in connection with the flow chart of FIG. 8 and the diagram of FIG. 10(b). FIG. 10(b) illustrates a portion of the ATW control area shown in FIG. 4(a) and shows, specifically, nine pairs of Radj and Badj values represented as points S1, S2, S3, S5, S6 . . . S10. For the purposes of explanation, and not as a limitation on the present invention, it is assumed that memory 14 has stored ten pairs of Radj and Badj values corresponding to points S1, S2, . . . S10 as follows:

S1: (127,127) is stored at (Rawb[1], Bawb[1])
S2: (129,126) is stored at (Rawb[2], Bawb[2])
S3: (144,108) is stored at (Rawb[3], Bawb[3])
S4: (241,200) is stored at (Rawb[4], Bawb[4])
S5: (120,130) is stored at (Rawb[5], Bawb[5])
S6: (123,134) is stored at (Rawb[6], Bawb[6])
S7: (142,119) is stored at (Rawb[7], Bawb[7])
S8: (108,118) is stored at (Rawb[8], Bawb[8])
S9: (121,146) is stored at (Rawb[9], Bawb[9])
S10: (127,129) is stored at (Rawb[10], Bawb[10])

Of course, another positive number of pairs of Radj and Badj values other than ten could be utilized equally effectively.

It is preferable to define a sample area SA within the ATW control area as corresponding to a particular type of lighting. For example, FIG. 10(b) illustrates a sample area SA which may correspond to light having an approximate temperature of 3200K, e.g. Radj and Badj have values greater than 120 but less than 136. Alternatively, sample area SA may have another shape such as a circle, an ellipse, or the like.

As shown, points S1, S2, S5, S6, and S10 lie within sample area SA, while points S3, S4, S7, S8, and S9 lie outside sample area SA. The points inside sample area SA may be considered similar to the desired type of lighting, and therefore, useful in adjusting the ATW control area. The points outside sample area SA may be considered too different from the desired type of lighting to be useful in adjusting the ATW control area. By separately averaging the Radj and Badj values represented by the points inside sample area SA, an average R gain adjustment value (Rav) and an average B gain adjustment value (Bav) can be calculated. These average values can then be used as offsets to correct (shift) the ATW control area.

Figure 8:
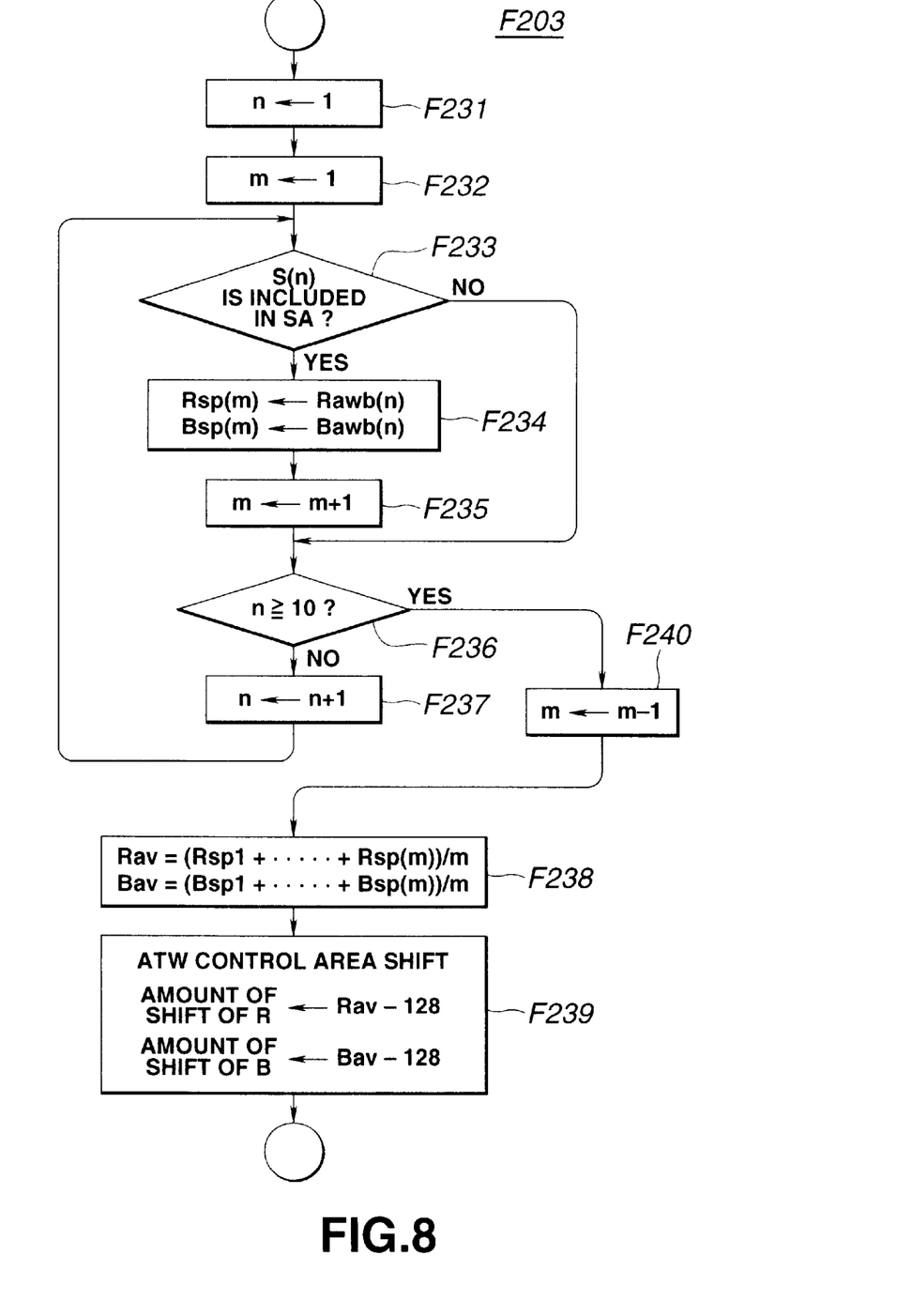
FIG. 8 is a flow chart to which reference will be made in describing a step from the flow chart of FIG. 7.

FIG. 8 illustrates steps F231–F239 which form step F203 by which controller 12 determines which stored points fall within the desired range and separately averages the values corresponding to such points. In step F231, a variable n is initialized by controller 12 with the value 1. Next, in step F232 a variable m is initialized by controller 12 with the value 1. Processing proceeds with step F233.

In step F233, controller 12 determines whether point Sn, i.e. (Rawb[n], Bawb[n]), is located within the desired sample area SA. If Sn is within SA, processing proceeds with step F234; otherwise, processing proceeds with step F236.

In step F234, the value stored at Rawb[n] is temporarily stored at another address, or register, Rsp[m], as a desired sampled R gain adjustment value. Similarly, the value stored at Bawb[n] is temporarily stored at another address, or register, Bsp[m], as a desired sampled B gain adjustment value. In the next step F235, the variable m is incremented by 1 and processing proceeds with step F236.

In step F236, if the variable n is less than the number of points to be considered, e.g. 10, then variable n is incremented by 1 and processing proceeds with step F233. Otherwise, processing proceeds with step F240 in which m is decremented by 1. Utilizing the data and sample area SA provided in FIG. 10(b) as an example, the desired sampled R and B gain adjustment values determined by controller 12 would be stored in memory 14 as follows:

Rsp[1]=127, Bsp[1]=127 (corresponding to point S1)
Rsp[2]=129, Bsp[2]=126 (corresponding to point S2)
Rsp[3]=120, Bsp[3]=130 (corresponding to point S5)
Rsp[4]=123, Bsp[4]=134 (corresponding to point S6)
Rsp[5]=127, Bsp[5]=129 (corresponding to point S10)

Following step F240, in step F238, controller 21 calculates an average R gain adjustment value (Rav) as the average of the m desired sampled R gain adjustment values. For example, the desired sampled R gain adjustment values are summed and the sum is divided by the number m to produce Rav. Similarly, controller 21 calculates an average B gain adjustment value (Bav) as the average of the m desired sampled B gain adjustment values. For example, the desired sampled B gain adjustment values are summed and the sum is divided by the number m to produce Bav. Utilizing the desired sample gain adjustment values provided in the example above, Rav=(127+129+120+123+127)/5=125 and
Bav=(127+126+130+134+129)/5=129.

Processing proceeds with step F239.

In step F239, an offset for the ATW control area is calculated by subtracting the ideal intermediate amplification value, e.g. 128 in the present example, from each of the average gain adjustment values Rav and Bav. Continuing the example above, an R gain offset of −3 (=125−128) and a B gain offset of 1 (=129−128) can be calculated. Controller 12 corrects (shifts) the ATW control area by an amount equal to the calculated R gain offset and B gain offset values. Further to the above example, correction of the ATW control area of FIG. 4(a) is achieved by shifting the ATW control area by three R gain units (to the left) and one B gain unit as shown in FIG. 10(a).

By sampling past gain adjustment values, controller 12 estimates the most acceptable correction amount (shifting) for the ATW control area to enable proper white balance operation under what is expected to be similar future lighting conditions. Controller 12 thus "learns" how much to adjust the ATW control area based upon past experience with previous AWB operations and/or manual ATW control area adjustments. Consequently, the white balance operation is optimized for a particular image based upon past white balance results and an improved white balance operation is achieved.

It is further noted that statistically, in imaging a certain image, periodic AWB operations will produce pairs of R and B signal gain adjustment values which have a distribution similar to that of a black body radiation curve. Thus, the historical values of the pairs of R and B signal gain adjustment values are an advantageous basis for an ATW control area. Upon repeated ATW operations, the ATW control area will be adjusted to center on the distribution of past pairs of R and B signal gain adjustment values.

In an alternate embodiment, step F240 is modified such that controller 21, after having decremented the variable m by one, determines if m is greater than a minimum value mv. For example, mv may equal five. If m is greater than mv, processing is proceeds with step F238; otherwise, no adjustment of the ATW control area is made at that time and processing proceeds with step F201. Such a feature limits the frequency of ATW control area adjustment until a minimum number of images having a relatively consistent pattern of lighting are imaged. Overall ATW control area adjustment and thus, white balance operation, are thereby improved.

Figure 11A:
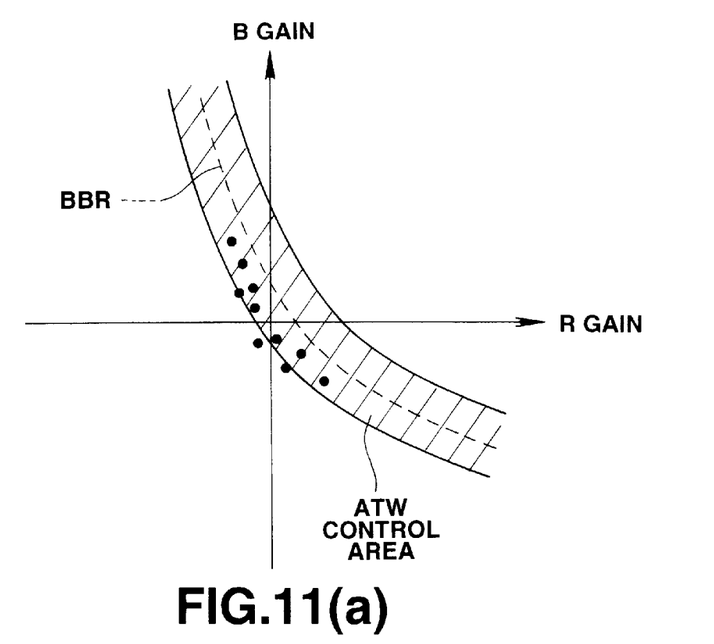
FIGS. 11(a) and 11(b) are diagrams of gain values.
Figure 11B:
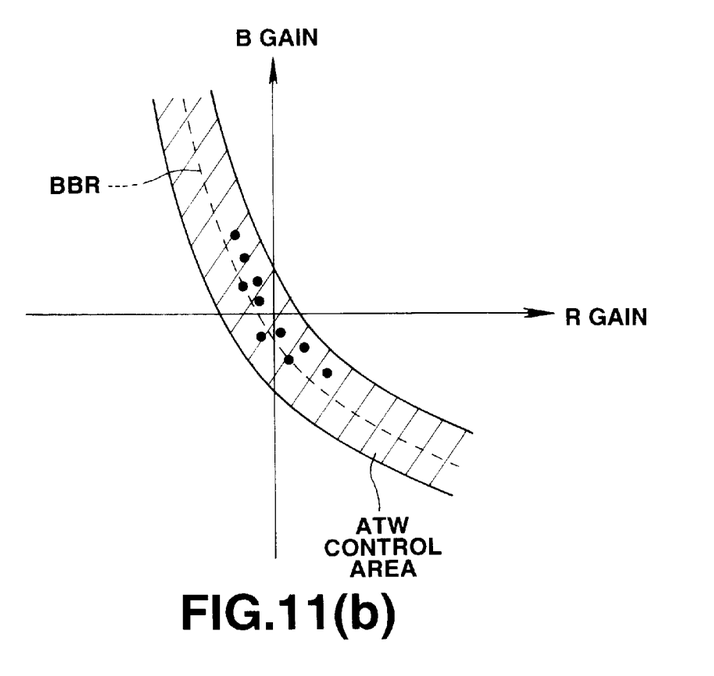

As an alternative to the above-described processing of step F203, controller 12 may instead determine from the R signal gain adjustment and B signal gain adjustment values, Radj and Badj, stored in memory 14 as (Rawb[1], Bawb[1]), (Rawb[2], Bawb[2]) . . . (Rawb[x], Bawb[x]), the R gain offset and B gain offset values which will result in the corrected ATW control area encompassing the most pairs of stored R and B signal gain adjustment values. For example, FIG. 11(a) illustrates ten points representing pairs of stored R and B signal gain adjustment values and an ATW control area. A maximization of the number of points encompassed by the ATW control area is illustrated in FIG. 11(b). This maximization may be achieved by a number of different conventional methods, such as a line-fit, a curve fit to black body radiation curve BBR, an area-fit to a sample number of points, or the like.

As will be understood by one of ordinary skill in the art, the term amplify, and synonyms thereof, utilized in the present specification refer to and encompass both the process of amplification and de-amplification. Also, color signals other than the red color signal and the blue color signal described herein, such as a green color signal, a yellow color signal, or the like, may be adjusted by the invention of the present application without departing from its scope.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. An imaging apparatus comprising:
   imaging means for converting an image into a plurality of color signals each having a signal level;
   white balance amplifier means, including at least first and second amplifiers for amplifying respective color signals, coupled to said imaging means, for adjusting the signal level of said plurality of color signals to produce a plurality of amplified color signals;
   calibration means for calibrating said white balance amplifier means and for producing at least one calibration parameter defining an automatic tracing white balance (ATW) control area which substantially tracks a black body radiation pattern, and is shifted with respect to intermediate gain values of said first and second amplifiers in accordance with results of an automatic white balance (AWB) measurement;
   detecting means, coupled to said white balance amplifier means, for detecting said plurality of amplified color signals;
   calculation means, coupled to said detecting means, for calculating, in an ATW operation, at least one white balance amplification adjustment as a function of said plurality of amplified color signals;
   comparing means for comparing said at least one white balance amplification adjustment with said at least one calibration parameter; and
   automatic adjustment means for automatically adjusting said white balance amplifier means to amplify the signal level of at least one of said plurality of color signals if said at least one white balance amplification adjustment is within said shifted ATW control area, and not adjusting said white balance amplifier means if said at least one white balance amplification adjustment is outside said shifted ATW control area.

2. Apparatus according to claim 1, further comprising storage means for storing said at least one calibration parameter and wherein said comparing means retrieves said at least one calibration parameter from said storage means.

3. Apparatus according to claim 1, wherein said calibration means comprises means for automatic white balancing.

4. Apparatus according to claim 1, wherein said calibration means comprises at least one user-adjustable signal adjustment means for adjusting the signal level of at least one of said plurality of color signals.

5. Apparatus according to claim 1, wherein said at least one calibration parameter comprises a plurality of calibration parameters.

6. Apparatus according to claim 1, wherein said at least one calibration parameter comprises a red color gain adjustment value.

7. Apparatus according to claim 1, wherein said at least one calibration parameter comprises a blue color gain adjustment value.

8. Apparatus according to claim 1, wherein said at least one calibration parameter comprises a green color gain adjustment value.

9. An imaging apparatus comprising:
   imaging means for converting an image into a plurality of color signals each having a signal level;
   white balance amplifier means, coupled to said imaging means, for adjusting the signal level of at least one of said plurality of color signals to produce a plurality of amplified color signals;
   calibration means for repeatedly calibrating said white balance amplifier means and for producing a plurality of calibration parameters;
   detecting means, coupled to said white balance amplifier means, for detecting said plurality of amplified color signals;
   first calculation means, coupled to said detecting means, for calculating at least one white balance amplification adjustment as a function of said plurality of amplified color signals;
   storage means for storing said plurality of calibration parameters;
   second calculation means for retrieving said plurality of calibration parameters from said storage means and for calculating an overall calibration factor as a function of said plurality of calibration parameters;
   comparing means for comparing said at least one white balance amplification adjustment with said overall calibration factor; and
   automatic adjustment means for automatically adjusting said white balance amplifier means to amplify the signal level of at least one of said plurality of color signals if said at least one white balance amplification adjustment is consistent with said overall calibration factor.

10. Apparatus as in claim 9, wherein said second calculation means calculates said overall calibration factor as an average of said plurality of calibration parameters.

11. Apparatus as in claim 9, wherein said second calculation means calculates said overall calibration factor as an average of calibration parameters corresponding to a color.

12. Apparatus as in claim 9, wherein said second calculation means calculates said overall calibration factor as a function of a distribution of said plurality of calibration parameters.

13. Apparatus as in claim 9, wherein said second calculation means calculates said overall calibration factor as a function of a plurality of calibration factors which are representative of a lighting condition.

14. Apparatus according to claim 9, wherein said calibration means comprises means for automatic white balancing.

15. Apparatus according to claim 9, wherein said calibration means comprises at least one user-adjustable signal adjustment means for adjusting the signal level of at least one of said plurality of color signals.

16. Apparatus according to claim 9, wherein said plurality of calibration parameters comprises a red color gain adjustment value and a blue color gain adjustment value.

17. Apparatus according to claim 9, wherein said plurality of calibration parameters are characteristic of a black body radiation pattern.

18. Apparatus according to claim 9, wherein said plurality of calibration parameters define an ATW control area which is substantially symmetric about a black body radiation pattern.

19. Appparatus according to claim 18, wherein said automatic adjustment means automatically adjusts said white balance amplifier means to amplify the signal level of at least one of said plurality of color signals if said at least one white balance amplification adjustment is within said ATW control area.

20. Appparatus according to claim 19, wherein said automatic adjustment means automatically does not adjust said white balance amplifier means if said at least one white balance amplification adjustment is outside said ATW control area.

21. Apparatus according to claim 18, further comprising maximizing means for maximizing a number of points encompassed by said ATW control area.

22. Apparatus according to claim 21, wherein said maximizing means employs line-fitting.

23. Apparatus according to claim 21 wherein said maximizing means employs curve fitting to a black body radiation curve.

24. Apparatus according to claim 21 wherein said maximizing means employs an area-fit to a sample number of points.

* * * * *

UNITED STATES PATENT AND TRADEMARK OFFICE
CERTIFICATE OF CORRECTION

PATENT NO. : 5,995,142

DATED : Nov. 30, 1999

INVENTOR(s) : Matsufune

It is certified that error appears in the above-identified patent and that said Letters Patent is hereby corrected as shown below:

Title page, item [30],
IN THE FOREIGN APPLICATION PRIORITY DATA:

Apr. 2, 1996    [JP]    Japan......................8-102041
    Feb. 3, 1997    [JP]    Japan......................9-032571

Signed and Sealed this

Twenty-fourth Day of October, 2000

Attest:

Q. TODD DICKINSON

*Attesting Officer*    *Director of Patents and Trademarks*